US006813963B2

(12) United States Patent
Bishop

(10) Patent No.: US 6,813,963 B2
(45) Date of Patent: Nov. 9, 2004

(54) FLUID VELOCITY TRANSDUCER

(75) Inventor: Wilfred Ignatius Bishop, Wembley (GB)

(73) Assignee: R. Thompson, Kent (GB)

( * ) Notice: Subject to any disclaimer, the term of this patent is extended or adjusted under 35 U.S.C. 154(b) by 0 days.

(21) Appl. No.: 10/470,812

(22) PCT Filed: Feb. 15, 2001

(86) PCT No.: PCT/GB01/00660
§ 371 (c)(1),
(2), (4) Date: Jul. 30, 2003

(87) PCT Pub. No.: WO02/065140
PCT Pub. Date: Aug. 22, 2002

(65) Prior Publication Data
US 2004/0050174 A1 Mar. 18, 2004

(51) Int. Cl.⁷ .............................. G01F 1/38; G01D 21/00
(52) U.S. Cl. ...................... 73/861.47; 73/866.5; 73/182
(58) Field of Search ...................... 73/861.47, 861.22, 73/715, 866.5, 182

(56) References Cited
U.S. PATENT DOCUMENTS
4,932,249 A * 6/1990 Nakamura et al. ............ 73/182
5,133,323 A * 7/1992 Treusch ...................... 123/494
6,085,599 A * 7/2000 Feller ...................... 73/861.13

* cited by examiner

Primary Examiner—Harshad Patel
(74) Attorney, Agent, or Firm—Brooks Kushman P.C.

(57) ABSTRACT

A transducer for measuring the relative velocity of movement of a body in a liquid or gaseous medium employs no reciprocating parts and functions by sensing the force applied to a diaphragm (6) die to its movement through the medium or the movement of the medium towards the diaphragm. The speed transducer makes use of a Hall effect solid state device (7) that produces an output when a magnetic field is applied to either of its surfaces. The level of the output voltage is proportional to the velocity of movement in the positive direction, i.e. when the force acts on diaphragm (6) in (FIG. 1). Since the transducer takes into account differential forces, an unwanted common force acting on both diaphragms simultaneously will have no effect on the measured speed. The tubular body (1) in which the Hall effect device is located may be made from any non-magnetic material suitable for the environment in which the transducer will be used.

11 Claims, 2 Drawing Sheets

FLUID VELOCITY TRANSDUCER

Figure 1:
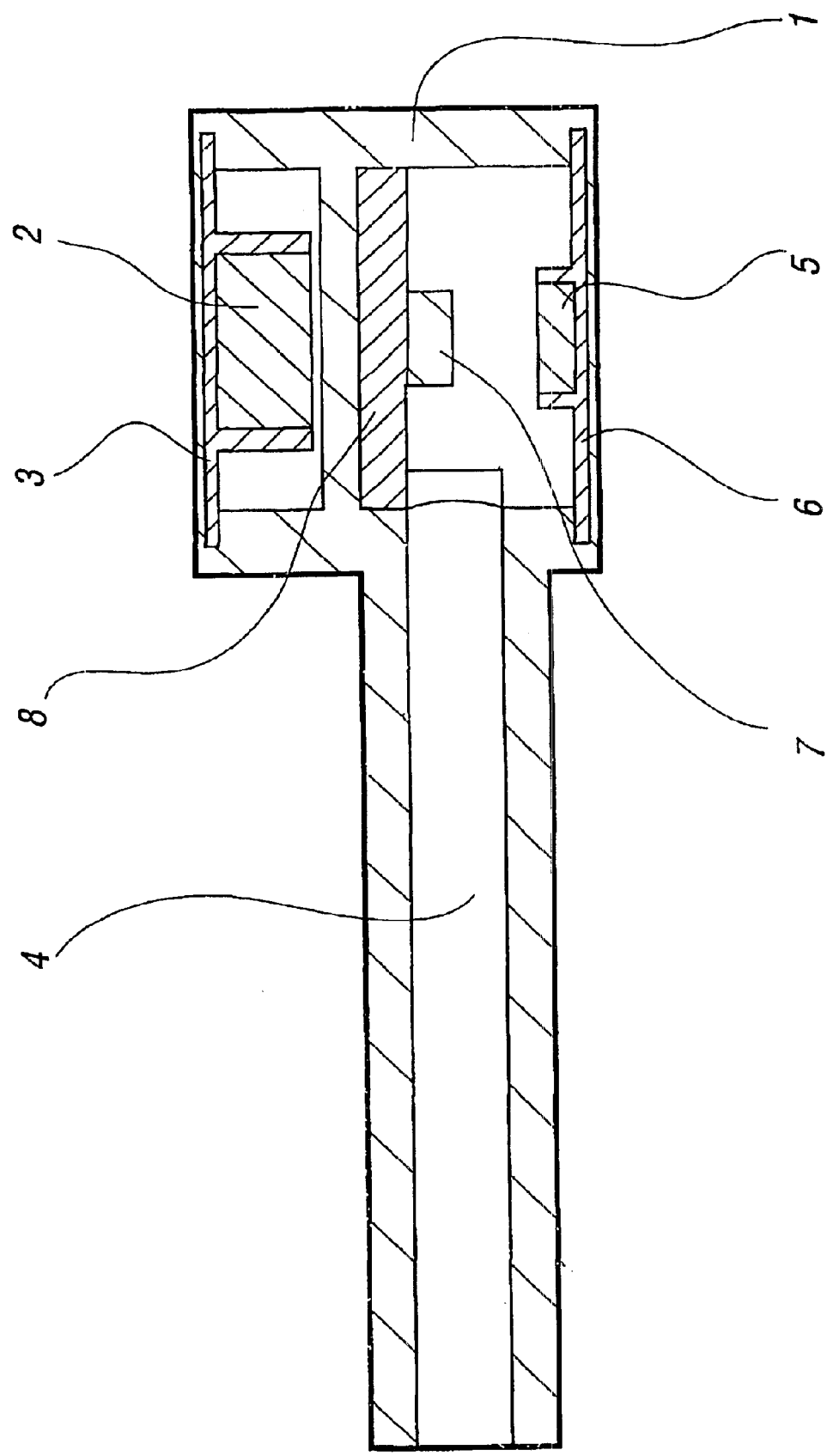

This invention relates to a velocity measuring device and is concerned with a transducer for measuring the relative velocity of movement of a fluid medium, for example water or air, either when the transducer is made to move through the fluid medium or the fluid medium moves towards the stationary transducer.

Many velocity transducers are in common use but most require reciprocating parts that wear or become stuck for one reason or another. For example, when used in a marine environment, the paddle wheel type must be serviced regularly because it is affected by weeds, barnacles and mud. For air or gas velocity measurement, the bearings of the rotating part must be of sufficient high quality to provide a reasonably long life and hence long-term, reliability.

It is an object of this invention to provide a velocity transducer that does not rely on reciprocating parts or bearings and will not require regular servicing even in a marine environment.

According to the invention, there is provided a fluid velocity transducer comprising a substantially tubular body having a fluid-tight outlet for signal wires, the body having located therein a Hall effect unit, and a pair of oppositely facing diaphragms positioned respectively at each end portion of the tubular body, each diaphragm having a magnet fixed to its interior surface, the arrangement being such that in use one of the diaphragms can receive an applied force due to a fluid and convert this force into a displacement relative to the Hall effect unit thereby increasing the magnetic field strength applied to the Hall effect unit so as to produce a signal output which can be processed to provide an indication of the speed of movement.

The transducer of the invention measures velocity by making use of a very small displacement produced by the force of the medium in which it moves or the force of the medium that moves on to it. The transducer responds to the differential forces applied to its surfaces and produces a signal output only when the two forces applied are unequal. The output signal is proportional to the velocity in the direction of motion and very little or no output is produced in other directions, except in the reverse direction if the transducer or medium is reversed.

The tubular body of the transducer may be made from any material suitable for the environment in which it is to be used. For a marine application, a plastics material such as, for example an ABS (acrylonitrile-butadiene-styrene) copolymer, is suitable for fabrication of the tubular body and also of the diaphragms. The Hall effect unit is advantageously mounted on a printed circuit board positioned in a central region of the tubular body. The diaphragms can be fixedly attached to the respective ends of the tubular body, for example by chemical bonding or thermal welding, so as to provide a fluid-tight seal for each end of the tubular body. The magnets attached to each diaphragm respectively are preferably of different sizes.

The velocity transducer of the invention can be used to measure the speed of movement of a vessel, for example a ship or boat, through water, for which purpose it will be fixed to the hull of the vessel below the waterline. Other uses may be to measure the speed of water flow in a river or the flow rate of a liquid or gas through a pipeline. It may also be used to measure wind speed on land or the sea.

The signal output from the Hall effect unit may be coupled to an interface unit to process the varying direct current signal from the transducer for digital display.

If desired, a thermistor may be attached to the printed circuit board in addition to the Hall effect unit to enable the ambient temperature of the liquid or gas to be measured.

Figure 2:
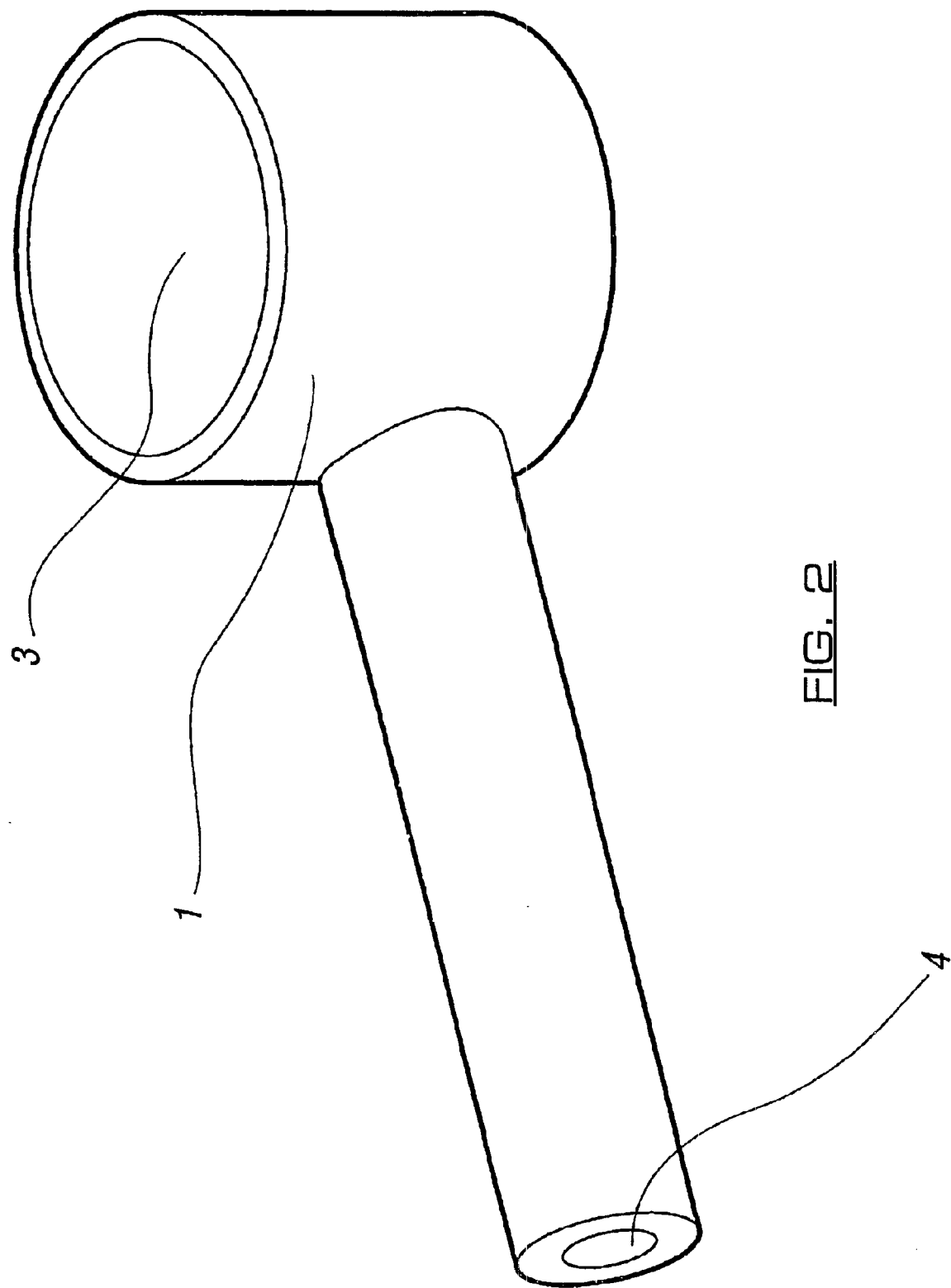

For a better understanding of the invention and to show how the same may be carried into effect, reference will now be made, by way of example, to the accompanying drawings in which:

FIG. 1 is an enlarged diagrammatic longitudinal axial cross-section of a velocity transducer; and FIG. 2 is a perspective view of the velocity transducer of FIG. 1.

Referring to the drawings, a liquid speed transducer has a body comprising a length of ABS plastics tubing 1. A watertight outlet 4, advantageously positioned in alignment with a central region of the tubular body 1, provides a path for electrical wires (not shown) for an output signal.

A linear Hall effect unity 7 is mounted in the central region of the tubular body on a printed circuit board 8.

A first diaphragm 3 and a second diaphragm 6 can transmit small movements from the outside and at the same time serve to seal the unit. The diaphragms both made of ABS plastics material, are fixedly positioned in recessed rims formed respectively at each end of the tubular body 1. The diaphragms have substantially equal surface areas.

A small magnet 5 is mounted on the central area of diaphragm 6 for which a suitable recess is provided. Likewise a larger magnet 2 is mounted on diaphragm 3 and fixed in a recess provided therefor.

A magnetic field from magnet 5 acting on the Hall effect unit 7 causes it to produce a differential output voltage. A magnetic field from magnet 2 acting on the Hall effect unit on the reverse side reduces the output voltage. The two magnets are placed relative to the Hall effect unit so that the output is zero with no external forces applied. The magnetic fields are in opposition to each other.

An external force acting on diaphragm 6 increases the magnetic field strength on the Hall effect unit 7 by reducing the gap between magnet 5 and unit 7 thus producing a positive output voltage proportional to the displacement of diaphragm 6 as a result of the applied force. Conversely external force acting on the diaphragm 3 reduces the output voltage.

The transducer will detect the velocity of liquid flowing on to diaphragm 6 because the displacement of the diaphragm produces a proportional output voltage as a result of the force of the liquid acting on the diaphragm. The unit will detect its own velocity only if it is moved through liquid in a direction so that the applied force acts preferably on diaphragm 6. Force acting on diaphragm 3 at the same time will have a negative effect and hence reduce the output, enabling the transducer to compensate for movement in other directions.

What is claimed is:

1. A fluid velocity transducer comprising a substantially tubular body having a fluid-tight outlet for signal wires, the body having located therein a Hall effect unit, and a pair of oppositely facing diaphragms positioned respectively at each end portion of the tubular body, each diaphragm having a magnet fixed to its interior surface, the arrangement being such that in use one of the diaphragms can receive an applied force due to a fluid and convert this force into a displacement relative to the Hall effect unit thereby increasing the magnetic field strength applied to the Hall effect unit so as to produce a signal output which can be processed to provide an indication of the speed of movement.

2. A fluid velocity transducer as claimed in claim 1, wherein the fluid-tight outlet for signal wires is positioned in alignment with a central region of the tubular body.

3. A fluid velocity transducer as claimed in claim 2, wherein the Hall effect unit is mounted on a printed circuit board in a central region of the tubular body.

4. A fluid velocity transducer as claimed in claim 2, wherein the diaphragms are fitted with magnets of different sizes.

5. A fluid velocity transducer as claimed in claim 4, wherein the respective spaces between the diaphragms and the surfaces of the Hall effect unit are such as to produce zero output voltage when no external forces are applied.

6. A fluid velocity transducer as claimed in claim 5, wherein the two diaphragms have substantially equal areas.

7. A fluid velocity transducer as claimed in claim 1, wherein the Hall effect unit is mounted on a printed circuit board in a central region of the tubular body.

8. A fluid velocity transducer as claimed in claim 1, wherein the diaphragms are fitted with magnets of different sizes.

9. A fluid velocity transducer as claimed in claim 8, wherein the respective spaces between the diaphragms and the surfaces of the Hall effect unit are such as to produce zero output voltage when no external forces are applied.

10. A fluid velocity transducer as claimed in claim 9, wherein the two diaphragms have substantially equal areas.

11. A fluid velocity transducer as claimed in claim 1, wherein the two diaphragms have substantially equal areas.

* * * * *